(12) United States Patent
Boll et al.

(10) Patent No.: US 12,378,115 B2
(45) Date of Patent: Aug. 5, 2025

(54) CATALYST SYSTEM AND METHOD FOR THE CATALYTIC COMBUSTION OF AMMONIA TO FORM NITROGEN OXIDES IN A MEDIUM-PRESSURE SYSTEM

(71) Applicant: Heraeus Deutschland Gmbh & Co. KG, Hanau (DE)

(72) Inventors: Willi Boll, Hanau (DE); Dirk Maier, Hanau (DE)

(73) Assignee: HERAEUS DEUTSCHLAND GMBH & CO., KG, Hanau (DE)

( * ) Notice: Subject to any disclaimer, the term of this patent is extended or adjusted under 35 U.S.C. 154(b) by 829 days.

(21) Appl. No.: 17/309,891

(22) PCT Filed: Jan. 9, 2020

(86) PCT No.: PCT/EP2020/050373

§ 371 (c)(1),
(2) Date: Jun. 28, 2021

(87) PCT Pub. No.: WO2020/148143

PCT Pub. Date: Jul. 23, 2020

(65) Prior Publication Data

US 2022/0089439 A1    Mar. 24, 2022

(30) Foreign Application Priority Data

Jan. 14, 2019   (EP) .................................... 19151598

(51) Int. Cl.
  *C01B 21/26*   (2006.01)
  *B01D 53/86*   (2006.01)
  (Continued)

(52) U.S. Cl.
  CPC ........ *C01B 21/265* (2013.01); *B01D 53/8634* (2013.01); *B01J 23/464* (2013.01);
  (Continued)

(58) Field of Classification Search
  None
  See application file for complete search history.

(56) References Cited

U.S. PATENT DOCUMENTS

| 2,831,752 A | 4/1958 | Luckey et al. |
| 3,660,024 A | 5/1972 | Gillespie |

(Continued)

FOREIGN PATENT DOCUMENTS

| CN | 201722148 U | 1/2011 |
| CN | 101554585 A | 4/2011 |

(Continued)

OTHER PUBLICATIONS

"International Search Report issued in PCT/EP2020/050377 on Jan. 27, 2020".

(Continued)

*Primary Examiner* — Jelitza M Perez
(74) *Attorney, Agent, or Firm* — Blank Rome LLP

(57) ABSTRACT

Known catalyst systems for the catalytic combustion of ammonia to form nitrogen oxides consist of a plurality of single- or multilayer catalyst gauzes warp-knitted, weft-knitted or woven from platinum-based noble metal wire, which, when arranged one behind the other in a fresh gas flow direction, form a front group of gauze layers and at least one downstream group of gauze layers arranged after the front group. To provide from this starting point a catalyst system for use in a medium-pressure plant for ammonia oxidation, with which a high service life and a high yield of the main product NO can be achieved, it is proposed that the front group comprises a gauze layer or a plurality of gauze layers made of a first, rhodium-rich noble metal wire, wherein the gauze layer or one of the gauze layers made of the rhodium-rich noble metal wire is a front gauze layer facing the fresh gas, and that the downstream group comprises gauze layers made of a second, rhodium-poor noble (Continued)

Figure 1:
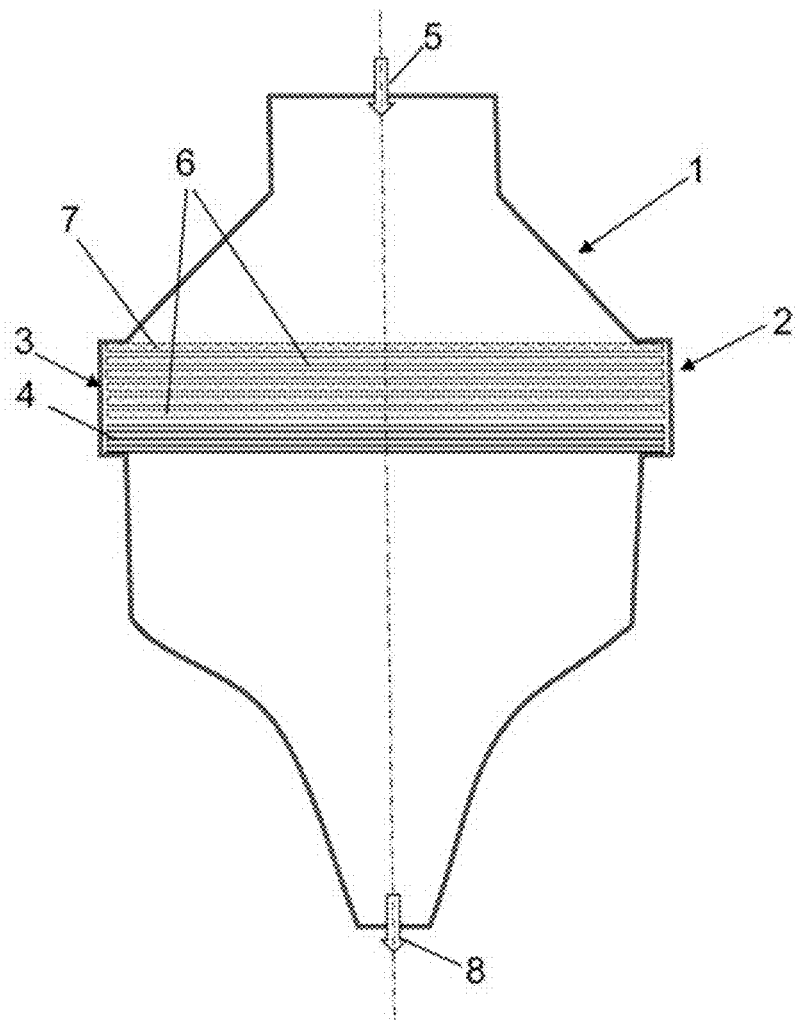

metal wire, wherein the rhodium content in the rhodium-rich noble metal wire is at least 7 wt. % and no more than 9 wt. % and is at least 1 percentage point higher than the rhodium content in the rhodium-poor noble metal wire.

17 Claims, 2 Drawing Sheets

(51) Int. Cl.
| | | |
|---|---|---|
| *B01J 23/46* | (2006.01) | |
| *B01J 35/00* | (2006.01) | |
| *B01J 35/58* | (2024.01) | |
| *C01B 21/28* | (2006.01) | |
| *D03D 1/00* | (2006.01) | |
| *D04B 1/22* | (2006.01) | |
| *D04B 21/20* | (2006.01) | |

(52) U.S. Cl.
CPC ............... *B01J 35/19* (2024.01); *B01J 35/58* (2024.01); *C01B 21/28* (2013.01); *D03D 1/00* (2013.01); *D04B 1/22* (2013.01); *D04B 21/20* (2013.01); *B01D 2255/1021* (2013.01); *B01D 2255/1025* (2013.01); *D10B 2101/20* (2013.01); *D10B 2403/0242* (2013.01)

(56) References Cited

U.S. PATENT DOCUMENTS

| | | | |
|---|---|---|---|
| 4,375,426 A | 3/1983 | Knapton et al. | |
| 4,469,666 A | 9/1984 | Stephenson et al. | |
| 4,869,891 A | 9/1989 | Handley | |
| 5,268,157 A | 12/1993 | Blass et al. | |
| 5,401,483 A | 3/1995 | Ostroff | |
| 5,527,756 A | 6/1996 | Ostroff | |
| 5,656,567 A | 8/1997 | Heywood | |
| 6,073,467 A | 6/2000 | Blass et al. | |
| 7,976,804 B2 | 7/2011 | Jantsch et al. | |
| 9,056,307 B2 | 6/2015 | Keller et al. | |
| 9,126,187 B2 | 9/2015 | Keller et al. | |
| 9,340,424 B2 | 5/2016 | Coupland | |
| 2002/0127932 A1 | 9/2002 | Neumann et al. | |
| 2003/0124046 A1 | 7/2003 | Gorywoda et al. | |
| 2007/0031314 A1 | 2/2007 | Axon et al. | |
| 2009/0084090 A1 | 4/2009 | Nakatsuji et al. | |
| 2014/0031201 A1 | 1/2014 | Keller et al. | |
| 2014/0031202 A1 | 1/2014 | Keller et al. | |
| 2022/0080396 A1 | 3/2022 | Boll et al. | |

FOREIGN PATENT DOCUMENTS

| | | | | |
|---|---|---|---|---|
| CN | 102935363 A | | 2/2013 | |
| DE | 2145842 A1 | | 3/1973 | |
| DE | 10105624 A1 | | 10/2002 | |
| DE | 60201502 T3 | | 11/2004 | |
| EP | 0504723 A1 | | 9/1992 | |
| EP | 2689841 A2 | | 1/2014 | |
| EP | 3056267 A1 | | 8/2016 | |
| RU | 2150389 C1 | | 6/2000 | |
| RU | 2212272 C1 | | 9/2003 | |
| RU | 2294239 C1 | | 2/2007 | |
| WO | WO-0187771 A1 | | 11/2001 | |
| WO | WO-02062466 A2 | * | 8/2002 | .......... B01J 19/2495 |
| WO | 2006051338 A2 | | 5/2006 | |
| WO | 2018065271 A1 | | 4/2018 | |
| WO | 2018151733 A1 | | 8/2018 | |

OTHER PUBLICATIONS

International Search Report issued in PCT/EP2020/050373 on Mar. 6, 2020.

Tips for a young family; 1959—RU only.

* cited by examiner

CATALYST SYSTEM AND METHOD FOR THE CATALYTIC COMBUSTION OF AMMONIA TO FORM NITROGEN OXIDES IN A MEDIUM-PRESSURE SYSTEM

CROSS REFERENCE TO RELATED APPLICATIONS

This application is a national stage of International Patent Application No. PCT/EP2020/050373, filed Jan. 9, 2020, which the claims the benefit of European Application No. EP 19151598.0, filed Jan. 14, 2019, the entire contents of which are incorporated by reference herein.

TECHNICAL FIELD

The present invention relates to a catalyst system for the catalytic combustion of ammonia to form nitrogen oxides in a medium-pressure plant, having a plurality of single- or multilayer catalyst gauzes warp-knitted, weft-knitted or woven from platinum-based noble metal wire, which, when arranged one behind the other in a fresh gas flow direction, form a front group of gauze layers and at least one downstream group of gauze layers arranged after the front group.

In addition, the invention relates to a process for the catalytic combustion of ammonia to form nitrogen oxides in a medium-pressure plant by passing a fresh gas that contains ammonia and oxygen through a catalyst system, whereby ammonia is burnt.

Nitric acid is produced on an industrial scale for the chemical industry and for fertiliser production by the heterogeneous noble metal catalysed oxidation of ammonia with oxygen to form nitrogen oxide according to the Ostwald process.

BACKGROUND ART

The catalyst systems employed for this purpose are installed in the reaction zone of a flow reactor in a plane perpendicular to the flow direction of the fresh gas, with a plurality of catalyst gauzes often being arranged one behind the other and combined to form a so-called catalyst pack.

The catalyst gauzes consist of single- or multilayer weft-knitted, woven or warp-knitted fabrics made of fine noble metal wires. The noble metal wires consist predominantly of platinum (Pt), palladium (Pd), rhodium (Rh) or alloys of these metals.

Ammonia oxidation can take place at low pressure (1-3 bar; PtRh10), medium pressure (3.5-7 bar; PtRh5) or at high pressure (8-14 bar, PtRh3). The binary PtRh alloy typically used for each pressure range is given in brackets, with numbers indicating the rhodium content as a percentage by weight).

From DE 101 05 624 A1, a flow reactor for the catalytic oxidation of ammonia is known, in which the catalyst system is in the form of a pack of a plurality of parallel catalyst gauzes. The pack is arranged in the reaction zone such that the planes spanned by the catalyst gauzes extend perpendicular to the flow direction of a fluid containing the reagents to be converted. To improve the catalytic activity and selectivity of the catalysed reaction and the mechanical strength and service life of the catalyst pack, the use of a three-dimensional warp-knitted catalyst gauze is proposed, in which the individual mesh layers are connected to each other by pile threads. Mesh and pile threads consist of the same material; e.g. PtRh5 or PtRh8.

EP 3 056 267 A1 proposes a modified noble metal catalyst gauze for reducing $N_2O$ formation in a medium-pressure ammonia oxidation process, in which a mesh layer made of weft-knitted noble metal wires composed of Pd or a Pd-rich alloy has a second noble metal wire with a different composition, produced e.g. from a PtRh alloy with 1-10% Rh, incorporated therein for reinforcement. To determine the catalytic properties of the modified catalyst gauze, it was installed in a test reactor together with other catalyst gauzes according to an industrial standard, and the amount of $N_2O$ generated at a pressure of 5 bar and a temperature of 890° C. was determined over time. As the standard here, a warp-knitted or (weft-knitted) catalyst gauze was used which was made of noble metal wire composed of a PtRh5 alloy with a diameter of 76 µm and with a grammage (grams per square meter) of 600 g/m².

The catalyst system known from WO 01/87771 A1 for reducing dinitrogen monoxide, which is formed in the catalytic combustion of ammonia and oxygen to form nitrogen oxides, comprises at least a first catalyst gauze and at least a second catalyst gauze in the flow direction of the fresh gas. The catalyst gauzes are each produced by weft-knitting, warp-knitting, weaving or the random laying of fibres. The first catalyst gauze consists of a PtRh alloy with 5 to 10 wt. % rhodium, and the second catalyst gauze consists of a PdRh alloy with at least 92 wt. % palladium and 2-4 wt. % rhodium, remainder platinum. Alternatively, the second catalyst gauze consists of 82 to 83 wt. % palladium and 2.5-3.5 wt. % rhodium, remainder platinum. In a further embodiment, the front catalyst gauze consists of a PtRh alloy with 8 wt. % rhodium, and a back catalyst gauze consists of a PdRhPt alloy with 3 wt. % rhodium, 15 wt. % platinum, remainder palladium. The amount of $N_2O$ generated in the reactor equipped with the catalyst system is compared with an industrial reactor, which is operated at a reactor pressure of 4.8 bar and a temperature of 880° C. and which is fitted with two standard catalyst systems, one of which is a catalyst pack composed of PtRh5 and PdNi5 gauzes and the other a catalyst pack composed of PtRh5 and PdNi5 gauzes.

WO 2002/062466 A2 describes a multilayer catalyst system with mutually connected gauze layers, which differ in their grammage but all consist of PtRh8 or PtRh5.

DE 21 45 842 A1 mentions that, after use of a catalyst system, a loss of palladium was detected, which was high compared with the loss of platinum. This is attributed to the fact that the catalyst gauzes on the gas outlet side reabsorb the platinum entrained in the gas stream.

Technical Problem

When ammonia is burned with oxygen, dinitrogen monoxide ($N_2O$) is obtained as an undesirable by-product, which damages the ozone layer and is a greenhouse gas. It is therefore important to avoid the formation of $N_2O$ as far as possible in the combustion reaction without negatively affecting the yield of desirable nitrogen oxides.

In nitric acid plants, depending on their design, between 2 and 30 catalyst gauzes of up to 6 m diameter are used. As a result of oxidation and sublimation, the catalyst gauzes lose noble metal during the ammonia oxidation process, so that from time to time (service life, operating life) they have to be replaced, at some expense. Noble metal use is costly and is kept as low as possible. On the other hand the "catalytic efficiency", which is an important parameter and a measure of consistently high starting material conversions and good yield, generally rises as the noble metal content increases up to a maximum content.

PtRh5 alloy has proved to be a suitable compromise with regard to service life, catalytic efficiency and noble metal use, and—as mentioned in EP 3 056 267 A1 and WO 01/87771 A1—has become widely accepted as the industrial standard for noble metal catalysts for use in medium-pressure plants.

The invention is based on the object of providing a catalyst system for use in a medium-pressure plant for ammonia oxidation, with which a higher yield of the main product NO, and therefore a higher catalytic efficiency, can be achieved than with the industrial standard without accepting any disadvantages regarding service life (noble metal losses) and the formation of the undesirable by-product $N_2O$.

In addition, the invention is based on the object of specifying a process for ammonia oxidation in a medium-pressure plant, by means of which a comparatively high NO product yield is achievable without accepting any disadvantages regarding service life and $N_2O$ formation.

SUMMARY OF THE INVENTION

With regard to the catalyst system, this object is achieved according to the invention, starting from a catalyst system of the type mentioned above, by the fact that the front group comprises at least one gauze layer made of a first, rhodium-rich noble metal wire, wherein the at least one gauze layer made of the rhodium-rich noble metal wire is a front gauze layer facing the fresh gas, and that the downstream group comprises gauze layers made of a second, rhodium-poor, noble metal wire, wherein the rhodium content in the rhodium-rich noble metal wire is at least 7 wt. % and no more than 9 wt. %, and is at least 1 percentage point higher than the rhodium content in the rhodium-poor noble metal wire.

The catalyst system comprises a catalyst pack, which is composed of platinum-based catalyst gauze layers of the front and downstream catalyst gauze layer groups, and potentially getter gauzes, which will not be considered in detail here. The catalyst gauze layers of the catalyst pack are formed by single- or multilayer catalyst gauzes made of platinum-based noble metal wires. Unless otherwise specified, the term "catalyst gauze" will also be used below as an equivalent to "catalyst gauze layer" in the sense of a single-layer catalyst gauze.

The front group contains at least one catalyst gauze layer. The downstream group generally represents the greatest proportion by weight and volume of the catalyst system and comprises a plurality of catalyst gauze layers. The front group and the downstream group can be separated from each other by catalyst gauzes with a different composition. In the preferred case, however, they are located immediately adjacent to one another.

The front group contains the front catalyst gauze layer in the fresh gas flow direction, which consists of the rhodium-rich noble metal wire.

The catalyst gauzes of the two groups consist of weft-knitted, woven or warp-knitted noble metal wires, which differ in their composition. In the rhodium-rich noble metal wire of the front group, the rhodium content is at least 7 wt. % and no more than 9 wt. % and it is at least 1 percentage point higher than the proportion by weight of rhodium in the rhodium-poor noble metal wire of the catalyst gauze layer(s) of the downstream group, in which the proportion by weight of rhodium is therefore no more than 6%.

The rhodium content in the rhodium-rich noble metal wire of the front group, with a value of at least 7 wt. %, is higher than in the standard for industrial nitric acid plants for medium-pressure operation, which has been optimised for efficiency, operating life and $N_2O$ avoidance, in which it is 5 wt. %. It is therefore surprising that a higher catalytic efficiency is achievable by using the rhodium-rich noble metal wire without this having any negative effects on operating life and $N_2O$ formation. However, this result is not achieved if all the subsequent catalyst gauze layers in the flow direction of the fresh gas likewise consist of a rhodium-rich noble metal wire, but only if the rhodium content decreases in the flow direction of the fresh gas, and the catalyst gauze layers of the downstream group consist of rhodium-poor noble metal wire, with the rhodium proportion by weight being no more than 6 wt. % here, and preferably in the range of the industrial standard value of 5 wt. %.

With the use of alloys having a rhodium content lower than 7 wt. % in the rhodium-rich noble metal wire, a small increase in catalytic efficiency is achieved. With a rhodium content higher than 9 wt. %, if pressure conditions and temperatures are unfavourable, rhodium oxides can form which cause a gradual decline in catalytic efficiency over the operating life of the catalyst system.

The majority of the total weight of the catalyst gauzes in a catalyst pack of the catalyst system, e.g. at least 70%, is made up of catalyst gauze layers composed of the rhodium-poor noble metal wire, and it is sufficient if only a small proportion by weight, e.g. less than 30%, preferably less than 25%, and particularly preferably less than 20%, is made up of gauze layers of the front group composed of the rhodium-rich noble metal wire. It has proved expedient if, for example, the front group comprises no more than three gauze layers.

With regard to a high catalytic efficiency together with minor or no negative effects on operating life and $N_2O$ formation, it has proved expedient if the rhodium content in the rhodium-poor noble metal wire is in the range of 4 to 6 wt. %, and in particular if the rhodium content in the rhodium-rich noble metal wire is in the range of 7.8 to 8.2 wt. % and the rhodium content in the rhodium-poor noble metal wire is in the range of 4.8 to 5.2 wt. %.

The catalyst system can contain catalyst gauzes composed of noble metal wire based on other noble metals, such as palladium or iridium, or noble metal wire composed of an alloy that contains another noble metal or a plurality of other noble metals apart from platinum and rhodium. Preferably, however, both the rhodium-poor noble metal wire and the rhodium-rich noble metal wire consist of a binary PtRh alloy.

It has surprisingly been shown that, to increase catalytic efficiency, it is sufficient if the front gauze layer alone forms the front group of gauze layers. This represents a particularly simple and therefore preferred embodiment of the catalyst system.

It has also proved advantageous in this regard if the front gauze layer—e.g. as a single layer or as a multiple layer of a multilayer catalyst gauze—lies on the gauze layers of the downstream group. In this case, the flow reactor containing the catalyst pack is in a vertical position and the flow direction is directed vertically from top to bottom.

The front gauze layer positioned on top in this case forms part of the catalyst pack. Friction and weight force are sufficient to hold the front gauze layer in position.

This simplifies the production of the catalyst system and the retrofitting of existing catalyst systems to form a catalyst system according to the present invention.

In addition, an embodiment has proved favourable in which the catalyst gauzes, arranged one behind the other in the fresh gas flow direction, form a catalyst pack composed of a front assembly with three catalyst gauzes having a first average grammage, and a downstream assembly of catalyst gauze layers arranged behind the front assembly having a second average grammage, wherein the average grammage of the front assembly has a weight reduction ranging from 1.5% to 29% relative to the second average grammage, and wherein the first average grammage is in the range of 410 to 530 $g/m^2$ and the second average grammage is in the range of 540 to 790 $g/m^2$.

In the front assembly, the first three catalyst gauze layers in the fresh gas flow direction are grouped together. The front assembly borders the downstream assembly, which likewise comprises a plurality of catalyst gauze layers.

Before being used for their intended purpose, the catalyst gauze layers have an initial nominal grammage which is prescribed e.g. in a specification or other stipulation. The catalyst gauze layers of an assembly can have the same nominal grammage or can differ from each other in this respect. It is the average grammage of the assembly that is being considered here, defined as the quotient of the sum of the nominal (initial) weights per unit area and the number of catalyst gauzes of the particular assembly. The single- or multilayer catalyst gauzes consist of platinum-based noble metal wire with a diameter d. The grammage of a catalyst gauze layer depends inter alia on the diameter of the relevant noble metal wire. The greater the wire diameter, the higher the grammage for a given mesh size.

The catalyst gauzes that are grouped together in the front assembly have a lower average grammage than the catalyst gauzes of the downstream assembly. As a result, the quantity of noble metal used decreases by from 1.5% to no more than 29%, preferably by no more than 25% (based on the second average grammage), and furthermore a lower packing density is obtained in the front longitudinal portion of the catalyst pack, which is associated with a decrease in noble metal use and at the same time leads to reduced loss of noble metal.

It has been shown that the decrease in packing density ensures good flow through the catalyst pack together with high mechanical stability, and that the decrease in noble metal use does not lead to a significant decrease in the yield of nitrogen oxides if the front assembly is restricted to just a few reduced-weight catalyst gauze layers. In itself, it would be expected that the saving in noble metal would also be accompanied by a marked decrease in the catalytic efficiency of the catalyst system. However, it has surprisingly been found that the catalytic efficiency can be largely maintained—within the limits of a measuring accuracy of approximately 0.3% (absolute)—if at the same time the difference between first average and second average grammage is kept low, and is specifically in the range of 1.5% to 29%, and preferably no more than 25%, relative to the second average grammage.

In order to largely maintain the catalytic efficiency, as desired, a comparatively narrow range of the average weights per unit area of the catalyst gauze layers of the first and second assemblies is required, as indicated above. An embodiment of the catalyst system in which the first average grammage is in the range of 415 to 510 $g/m^2$ and the second average grammage is in the range of 575 to 710 $g/m^2$ has proved particularly expedient.

The differences in the grammage or average grammage can be based on the wire gauge of the noble metal wire. However, it has also proved particularly expedient if the catalyst gauze layers of the front and downstream assemblies are made from a noble metal wire with the same or approximately the same wire gauge, and if the difference in grammage is substantially due to different warp-knit, weft-knit or weave patterns of the catalyst gauzes. Accordingly, the catalyst gauze layers of the front assembly consist of a weft-knitted fabric with a first weft-knit pattern and a first mesh size, or of a woven fabric with a first weave pattern and a first mesh size, or of a warp-knitted fabric with a first warp-knit pattern and a first mesh size, and the catalyst gauze layers of the downstream assembly consist of a weft-knitted fabric with a second weft-knit pattern and a second mesh size, or of a woven fabric with a second weave pattern and a second mesh size, or of a warp-knitted fabric with a second warp-knit pattern and a second mesh size, wherein the first mesh size is greater than the second mesh size.

The difference in grammage is therefore not based, or not exclusively based, on differences in the wire gauges, but substantially on different weft-knit, warp-knit or weave patterns of the catalyst gauzes, and specifically on the mesh sizes. The mesh size of the catalyst gauze layers of the front assembly thus results in an average grammage substantially no more than 29% lower, preferably no more than 25% lower, than that of the catalyst gauze layers of the downstream assembly. The catalyst gauze layers of the downstream assembly are in the form of e.g. standard catalyst gauzes for medium-pressure operation with a wire diameter of 76 μm and a grammage of 600 $g/m^2$.

The comparatively more open configuration of the meshes in the catalyst gauze layers of the front assembly can also contribute to improved utilisation of the flow occurring in the catalyst pack, and thus to higher selectivity of the catalyst system. This is because the reaction usually takes place in the gauze pack in the front (top) gauze layers, and therefore these are subject to particularly severe thermal and mechanical loads. A more open configuration of the meshes in this region allows the load to be distributed from the upper gauze layers to gauze layers further down, so that despite the lower noble metal use, the efficiency of the catalyst system is not significantly decreased.

The reduced-weight catalyst gauzes of the "front assembly" with the first, lower, average grammage can at the same time form the gauze layers of the "front group" composed of the rhodium-rich alloy; generally—and preferably—however, these modules of the catalyst pack are different.

The lower the individual grammage of a single catalyst gauze layer, the greater the saving of noble metal. On the other hand, the catalytic efficiency of the catalyst system can decline with low average weights per unit area. It is therefore provided in a preferred embodiment of the catalyst system that the individual grammage of the catalyst gauze layers of the front assembly is constant or increases in the order in the fresh gas flow direction.

With regard to the process, the above-mentioned technical object is achieved, starting from a process of the type mentioned above, by passing the fresh gas with an ammonia content of between 9.5 and 12 vol. % through a catalyst system according to the present invention under a pressure in the range of between 3.5 and 7 bar, at a catalyst gauze temperature in the range of 870 to 920° C. and with a throughput in the range of 6 to 16 $tN/m^2$ d.

The abbreviation "$tN/m^2$ d" here stands for "tonnes of nitrogen (from ammonia) per day and effective cross-sectional area of the catalyst pack in square metres". The process is designed for operation in the medium-pressure range of between 3.5 and 7 bar. With an ammonia content of less than 9.5 vol. % in the fresh gas and a throughput of less than 6 tN/m² d, the combustion process can come to an unintended halt. An $NH_3$ content of more than 12 vol. % in the fresh gas is close to the safety threshold for an explosive mixture. At a catalyst gauze temperature of less than 870° C., increasing formation of rhodium oxide can occur; and at a catalyst gauze temperature higher than 920° C., platinum oxide volatilisation occurs to a greater degree. The catalyst gauze temperature is influenced by the preheat temperature of the fresh gas, which is preferably in the range of 150 and 220° C.

Definitions

Noble Metal Wire

A noble-metal-containing wire is understood to be a wire consisting of noble metal or containing a significant proportion (>50 wt. %) of noble metal. A platinum-based alloy contains more than 50 wt. % platinum. The rhodium-rich noble metal wire and the rhodium-poor noble metal wire consist substantially of platinum and rhodium. Further alloying elements that should be mentioned are in particular palladium, rhodium and ruthenium. Typical noble metal wire diameters are in the range of 40 to 120 μm.

Medium-Pressure Plants

In medium-pressure plants, ammonia oxidation takes place under a pressure in the range of 3.5 to 7 bar. For this pressure range, noble metal catalysts made of noble metal wire composed of a binary PtRh5 alloy with a diameter of 76 μm and a grammage of approximately 600 g/m² have become established as standard.

Catalyst Gauze

A single-layer or multilayer textile fabric produced by weaving, weft-knitting or warp-knitting a noble metal wire or a plurality of noble metal wires. The textile surface-formation is achieved by interlacing one or more thread systems or wire systems in a mesh-like manner.

Catalyst System

The catalyst system comprises a catalyst pack and generally a getter gauze or a plurality of getter gauzes, which have likewise been produced by warp-knitting, weaving or weft-knitting of a noble metal wire.

Catalyst Pack

An arrangement of a plurality of catalyst gauzes one behind the other in the flow direction of the fresh gas.

EXEMPLARY EMBODIMENT

Figure 2:
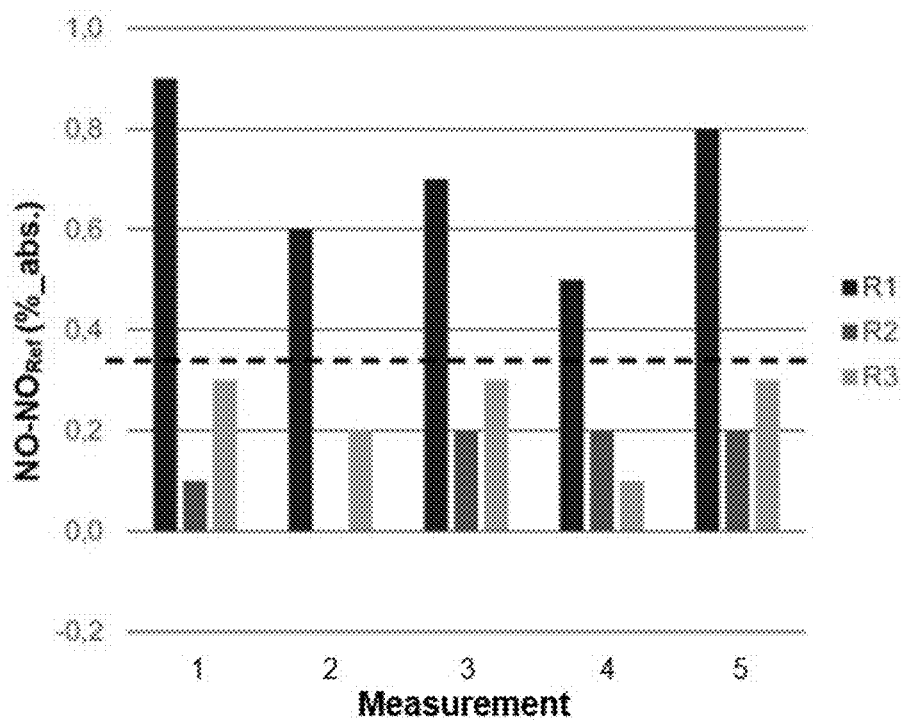
Figure 3:
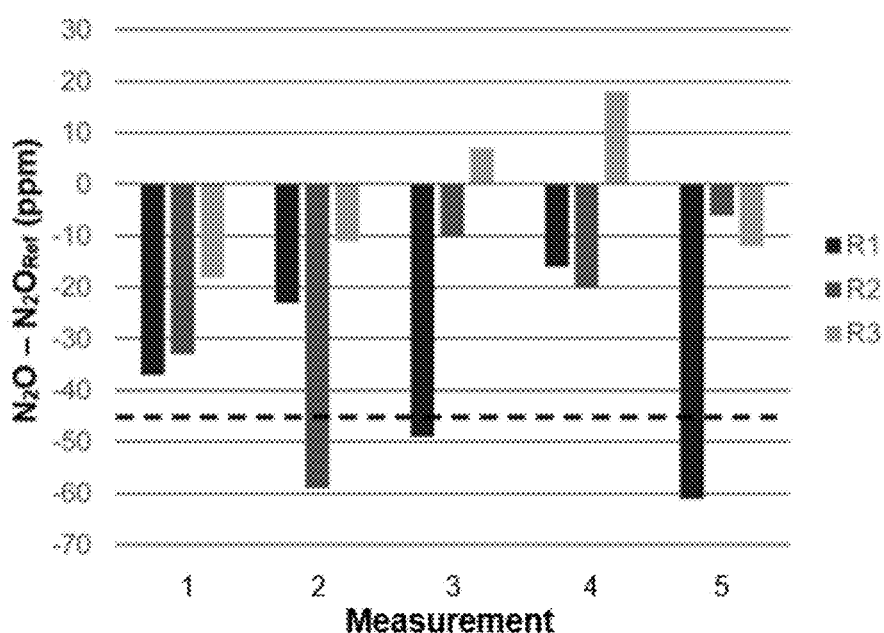

The invention will be explained below with the aid of exemplary embodiments and a drawing. The figures show in:

FIG. 1 a flow reactor for the heterogeneous catalytic combustion of ammonia in a schematic diagram, FIG. 2 a bar chart with results for the catalytic efficiency of test reactors compared with a reference reactor, and FIG. 3 a bar chart with results for the $N_2O$ formation of the test reactors compared with the reference reactor FIG. 1 is a schematic view of a vertically positioned flow reactor 1 for the heterogeneous catalytic combustion of ammonia. The catalyst system 2 forms the actual reaction zone of the flow reactor 1. It comprises a catalyst pack 3 and downstream getter gauzes 4. The catalyst pack 3 comprises a plurality of single-layer catalyst gauzes 6, arranged one behind the other in the flow direction 5 of the fresh gas, composed of a first, comparatively "rhodium-poor", PtRh noble metal wire, on which a further single-layer catalyst gauze 7 composed of a second, comparatively "rhodium-rich", PtRh noble metal wire is laid. The front catalyst gauze 7 in the flow direction 5 forms the single layer of the "front group of catalyst gauze layers" and the remaining catalyst gauzes 6 form a "downstream group of catalyst gauze layers" within the meaning of the invention. Examples of rhodium-poor and rhodium-rich noble metal wire compositions and actions of these and similar catalyst gauze systems will be explained in more detail below. Embodiments are specified in more detail in Tables 1 to 4.

The fresh gas is an ammonia-air mixture with a nominal ammonia content of 10.7 vol. %. It is heated to a preheat temperature of 175° C. and fed into the reactor 1 from the top under an elevated pressure of 5 bar. When it enters the catalyst pack 3, an ignition of the gas mixture occurs followed by an exothermic combustion reaction, which covers the entire catalyst pack 3. The following primary reaction takes place here:

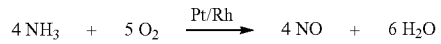

Ammonia ($NH_3$) is converted to nitrogen monoxide (NO) and water ($H_2O$) in this reaction. The nitrogen monoxide (NO) that is formed reacts with excess oxygen in the downward-flowing reaction gas mixture (symbolised by the directional arrow 8 showing the flow direction of the reaction gas mixture) to form nitrogen dioxide ($NO_2$), which is reacted with water to form nitric acid ($HNO_3$) in a downstream absorption plant.

The catalyst gauzes 6, 7 are each textile fabrics produced by machine warp-knitting a noble metal wire with a diameter of 76 μm composed of various binary platinum-rhodium alloys. In the flow reactor 1, the catalyst systems specified in Tables 1 to 4 were tested.

In the test reactors, the catalyst pack comprises six single-layer catalyst gauzes 6, 7, which were produced by weft-knitting a noble metal wire composed of a binary PtRh alloy. The sequence in which items are named in the table reflects their order in the flow direction of the fresh gas. In addition, getter gauzes 4 are provided in all the reactors, consisting of six active catchment gauze layers ("getter gauzes") composed of Pd82.5Pt15Rh2.5.

The reference reactor according to Table 1 represents a reactor according to the current industrial standard for medium-pressure plants. The single-layer catalyst gauzes are produced from a noble metal wire with a wire diameter of 76 μm. The grammage of each of the PtRh5 catalyst gauzes used is 600 g/m² as stated in the column "grammage/layer" The sum of the grammages of all the layers L1 to L6 of the catalyst pack is therefore 3600 g/m². The grammages are nominal, initial grammages, as can be achieved as standard with a noble metal wire having a wire diameter of 76 μm.

TABLE 1

| Reference reactor | | |
| --- | --- | --- |
| Gauze layer | Noble metal | Grammage/layer [g/m²] |
| L1 | PtRh5 | 600 |
| L2 | PtRh5 | 600 |

TABLE 1-continued

Reference reactor

| Gauze layer | Noble metal | Grammage/layer [g/m²] |
|---|---|---|
| L3 | PtRh5 | 600 |
| L4 | PtRh5 | 600 |
| L5 | PtRh5 | 600 |
| L6 | PtRh5 | 600 |
| | | Σ: 3600 |

In the following Tables 2 to 4, data relating to test reactors R1 to R3 are given. In the "Group allocation" column, the number "1" means that the respective catalyst gauze layer is allocated to the front group (also referred to below as "group 1"), and the number "2" shows that the respective catalyst gauze layers are allocated to the downstream group (also referred to below as "group 2"). In all the test reactors R1 to R3, the front catalyst gauze layer L1 alone forms the "front group" within the meaning of the invention.

TABLE 2

Test reactor Ref. 1

| Gauze layer | Noble metal | Group allocation | Grammage/layer [g/m²] |
|---|---|---|---|
| L1 | PtRh8 | 1 | 600 |
| L2 | PtRh5 | 2 | 600 |
| L3 | PtRh5 | 2 | 600 |
| L4 | PtRh5 | 2 | 600 |
| L5 | PtRh5 | 2 | 600 |
| L6 | PtRh5 | 2 | 600 |
| | | | Σ: 3600 |

In the test reactor R1, the top catalyst gauze layer consists of a PtRh8 alloy; the remaining catalyst gauzes consist of the conventional PtRh5 alloy as in the reference reactor.

TABLE 3

Test reactor R2

| Gauze layer | Noble metal | Group allocation | Grammage/layer [g/m²] |
|---|---|---|---|
| L1 | PtRh10 | 1 | 600 |
| L2 | PtRh5 | 2 | 600 |
| L3 | PtRh5 | 2 | 600 |
| L4 | PtRh5 | 2 | 600 |
| L5 | PtRh5 | 2 | 600 |
| L6 | PtRh5 | 2 | 600 |
| | | | Σ: 3600 |

In the test reactor R2, the top catalyst gauze layer consists of a PtRh10 alloy; the remaining catalyst gauzes again consist of the conventional PtRh5 alloy.

TABLE 4

Test reactor R3

| Gauze layer | Noble metal | Group allocation | Grammage/layer [g/m²] |
|---|---|---|---|
| L1 | PtRh8 | 1 | 600 |
| L2 | PtRh5 | 2 | 421 |
| L3 | PtRh5 | 2 | 421 |
| L4 | PtRh5 | 2 | 600 |
| L5 | PtRh5 | 2 | 600 |
| L6 | PtRh5 | 2 | 600 |
| | | | Σ: 3242 |

In the test reactor R3, the top catalyst gauze layer consists of a PtRh8 alloy and has a grammage of 600 g/m². The two immediately following catalyst gauzes consist of a PtRh5 alloy and have a warp-knit pattern with a larger mesh size, leading to a comparatively low grammage of 421 g/m². The last two catalyst gauzes of the catalyst pack again consist of the PtRh5 alloy and have a grammage of 600 g/m². The use of noble metal in reactor R3 is 358 g/m² lower than in the reference reactor and in test reactor R1.

The gauze layers L1 to L3 form a front assembly within the meaning of a preferred embodiment of the invention, in which a noble metal saving is obtained, compared with a standard reactor, by the fact that the catalyst gauzes of the front assembly have, within narrow limits, a lower noble metal content than the catalyst gauzes of the downstream assembly. In the exemplary embodiment, the average grammage of the front assembly is 481 g/m², which is approximately 20% less than the average grammage of the downstream assembly with the catalyst gauze layers L4 to L6.

The test reactors were operated under the following test conditions, which were identical in each case.
Pressure: 5 bar (absolute)
Throughput: 12 tonnes nitrogen (from ammonia) per day and effective cross-sectional area of the catalyst pack in square metres (abbreviated as 12 tN/m² d)
$NH_3$ content: 10.7 vol. % in the fresh gas
Preheat temp: 175° C. (temperature of the $NH_3$/air mixture), giving a gauze temperature of 890° C. in the test reactors.

At intervals of approximately 24 h, the NO yield and the proportion of $N_2O$ forming as a by-product were measured to determine changes in catalytic efficiency. Five test results were obtained for each of the test reactors R1 to R4.

The procedure for measuring the catalytic efficiency (i.e. the NO product yield) was as follows:
1. It was first ensured that the service life of the catalyst system is comparable with that of the reference reactor and that the catalyst system is suitable for the complete conversion of the ammonia being used. This means that $NH_3$ is no longer present in the product gas in a significant quantity, as verified by mass spectrometry measurement of the product gas.
2. A sample of $NH_3$/air was taken upstream of the catalyst pack at the same time as a sample of the product gas was taken downstream in separately evacuated flasks. The mass of the gas was determined by weighing.
3. The $NH_3$/air mixture was absorbed in distilled water and titrated to colour change using 0.1 N sulfuric acid and methyl red.
4. The nitrous product gases were absorbed in 3% sodium peroxide solution and titrated to colour change using 0.1 N sodium hydroxide solution and methyl red.
5. The catalytic efficiency eta was obtained from: eta=100×Cn/Ca, wherein Ca is the average $NH_3$ concentration from 7 individual measurements in the fresh gas as a percentage by weight, and Cn is the average NOx concentration from 7 individual measurements, expressed as a percentage by weight of $NH_3$ that has been oxidised to form NOx.

6. Separately, the proportion by volume of $N_2O$ in the product gas was determined by gas chromatography.

The test results are compiled in Table 5. The sequential number of the measurement entered in column 1 corresponds approximately to the operating time of the catalyst system in days. In the columns labelled "NO—$NO_{Ref}$" in Table 5, the yield difference of nitrogen monoxide is given in absolute percentage points compared with the reference reactor (e.g. measurement no. 1 in reactor R1 gives an NO yield of 96.2%, and therefore a difference NO—$NO_{Ref}$ of +0.9 percentage points compared with the measured value of 95.3% in the reference reactor). In the columns labelled "$N_2O$—$N_2O_{Ref}$", the difference in dinitrogen monoxide is given compared with the reference reactor in each case in ppm by volume (vol. ppm).

Reactor R2 shows a yield of the main product NO which, taking account of measurement error, is no higher than that of the reference reactor. This effect can only be attributed to the particularly rhodium-rich front catalyst gauze layer L1 in R2. Reactor R2 therefore does not display improved catalytic efficiency and to this extent it represents a comparative example for the invention.

The diagram of FIG. 3 shows the test results for $N_2O$ formation in the test reactors R1 to R3. On the y-axis, the difference in the quantity of dinitrogen monoxide in the product gas ($N_2O$—$N_2O_{Ref}$) by comparison with the reference reactor is entered in vol. ppm. On the x-axis, the numerals 1 to 5 again represent the sequential number of each measurement.

Accordingly, in all the test reactors R1 to R3 an $N_2O$ formation is obtained which is comparable to that of the reference reactor, taking account of measurement error.

The standard measurement error is approximately +/−50 vol. ppm and is again indicated by a broken line.

TABLE 5

| | Reference reactor | | Reactor 1 | | Reactor 2 | | Reactor 3 | |
|---|---|---|---|---|---|---|---|---|
| No. | Yield NO vol. % | $N_2O$ vol. ppm | NO − $NO_{Ref}$ [%_abs] | $N_2O$ − $N_2O_{Ref}$ [ppm] | NO − $NO_{Ref}$ [%_abs] | $N_2O$ − $N_2O_{Ref}$ [ppm] | NO − $NO_{Ref}$ [%_abs] | $N_2O$ − $N_2O_{Ref}$ [ppm] |
| 1 | 95.3 | 868 | 0.9 | −37 | | | | |
| 2 | 95.4 | 867 | 0.6 | −23 | | | | |
| 3 | 95.3 | 889 | 0.7 | −49 | | | | |
| 4 | 95.6 | 899 | 0.5 | −16 | | | | |
| 5 | 95.4 | 936 | 0.8 | −61 | | | | |
| 1 | 95.4 | 840 | | | 0.1 | −33 | | |
| 2 | 95.3 | 830 | | | 0.0 | −59 | | |
| 3 | 95.2 | 730 | | | 0.2 | −10 | | |
| 4 | 95.2 | 866 | | | 0.2 | −20 | | |
| 5 | 95.1 | 860 | | | 0.2 | −6 | | |
| 1 | 95.2 | 870 | | | | | 0.3 | −18 |
| 2 | 95.3 | 834 | | | | | 0.2 | −11 |
| 3 | 95.3 | 867 | | | | | 0.3 | 7 |
| 4 | 95.4 | 899 | | | | | 0.1 | 18 |
| 5 | 95.2 | 945 | | | | | 0.3 | −12 |

Test Results

The test results from Table 5 are illustrated graphically in the diagrams of FIGS. 2 and 3, and will be explained in more detail below with reference to these figures.

The diagram of FIG. 2 shows a measure of the catalytic efficiency for a nitrogen throughput of 12 $tN/m^2$ d for each of the reactors R1 to R3. On the y-axis, the difference in the nitrogen monoxide yield compared with the reference reactor "NO—$NO_{Ref}$" is entered in absolute percentage points (%_abs.). On the x-axis, the numerals 1 to 5 indicate the sequential number of each measurement.

According to the diagram, significantly higher efficiency in conversion to NO is obtained in reactor R1 compared with the reference reactor according to the industrial standard. The increase in efficiency varies around 0.6% which, for a typical quantity of ammonia used in an industrial reactor, approximately 12 $tN/m^2$ d, means an additional mass of 154 kg $NO/m^2$ d.

In reactor R3, despite the lower noble metal use, a catalytic efficiency is obtained which is comparable to the yield in the reference reactor within the limits of measurement error. The measurement error is approximately +/−0.3 percentage points, as marked by the broken line. However, since the first layer has a higher grammage than the lower layers of the first assembly, no significant gain in efficiency as in reactor 1 is visible.

The invention claimed is:

1. A catalyst system for the catalytic combustion of ammonia to form nitrogen oxides in a medium-pressure plant, having a plurality of single- or multilayer catalyst gauzes warp-knitted, weft-knitted or woven from platinum-based noble metal wire, which, when arranged in a fresh gas flow direction, form a front group of gauze layers and at least one downstream group of gauze layers arranged after the front group, characterized in that the front group comprises at least one gauze layer made of a first, rhodium-rich noble metal wire, wherein the at least one gauze layer made of the rhodium-rich noble metal wire is a front gauze layer facing the fresh gas, and in that the downstream group comprises gauze layers made of a second, rhodium-poor noble metal wire, wherein the rhodium-rich noble metal wire contains at least 7 wt. % and no more than 9 wt. % rhodium, and wherein the rhodium-poor noble metal wire contains 4 to 6 wt. % rhodium, and wherein each of the rhodium-rich noble metal wire and the rhodium-poor noble metal wire consist of platinum and rhodium.

2. The catalyst system of claim 1, wherein the rhodium-rich noble metal wire contains 7.8 to 8.2 wt. % rhodium and the rhodium-poor noble metal wire contains 4.8 to 5.2 wt. % rhodium.

3. The catalyst system of claim 1, wherein the front group of the gauze layers has a proportion by weight of less than 30% of all the catalyst gauzes in a catalyst pack.

4. The catalyst system of claim 1, wherein the front group comprises no more than three gauze layers.

5. The catalyst system of claim 1, wherein the front group of gauze layers is formed by a frontmost gauze layer.

6. The catalyst system of claim 5, wherein the frontmost gauze layer lies on the gauze layers of the downstream group.

7. The catalyst system of claim 1, wherein the catalyst gauzes arranged in the fresh gas flow direction form a catalyst pack composed of a front assembly with three catalyst gauzes having a first average grammage, and a downstream assembly of catalyst gauze layers arranged behind the front assembly having a second average grammage.

8. The catalyst system of claim 7, wherein the average grammage of the front assembly has a weight reduction ranging from 1.5% to 29% relative to the second average grammage, the first average grammage is in the range of 410 to 530 $g/m^2$, and the second average grammage is in the range of 540 to 790 $g/m^2$.

9. The catalyst system of claim 7, wherein the catalyst gauzes of the front assembly consist of a warp-knitted fabric with a first warp-knit pattern and a first mesh size, or of a woven fabric with a first weave pattern and a first mesh size, or of a weft-knitted fabric with a first weft-knit pattern and a first mesh size, and the catalyst gauzes of the downstream assembly consist of a warp-knitted fabric with a second warp-knit pattern and a second mesh size, or of a woven fabric with a second weave pattern and a second mesh size, or of a weft-knitted fabric with a second weft-knit pattern and a second mesh size, wherein the first mesh size is greater than the second mesh size.

10. The catalyst system of claim 7, wherein an individual grammage of the catalyst gauze layers of the front assembly is constant or increases in the fresh gas flow direction.

11. The catalyst system of claim 1, wherein the front group of the gauze layers has a proportion by weight of less than 25% of all the catalyst gauzes in a catalyst pack.

12. The catalyst system of claim 1, wherein the front group of the gauze layers has a proportion by weight of less than 20% of all the catalyst gauzes in a catalyst pack.

13. The catalyst system of claim 8, wherein the weight reduction is no more than 25%, the first average grammage is in the range of 415 to 510 $g/m^2$, and the second average grammage is in the range of 575 to 710 $g/m^2$.

14. The catalyst system of claim 7, wherein the catalyst system further comprises one or more getter gauzes downstream of the catalyst pack.

15. The catalyst system of claim 14, wherein the one or more getter gauzes are composed of Pd82.5Pt15Rh2.5.

16. The catalyst system of claim 3, wherein the catalyst system further comprises one or more getter gauzes downstream of the catalyst pack.

17. The catalyst system of claim 16, wherein the one or more getter gauzes are composed of Pd82.5Pt15Rh2.5.

* * * * *